US006395845B1

(12) United States Patent
Weinmann et al.

(10) Patent No.: US 6,395,845 B1
(45) Date of Patent: *May 28, 2002

(54) WATERPROOFING MEMBRANE FROM EPOXY RESIN AND AMINE-TERMINATED POLYAMIDE

(75) Inventors: Daniel James Weinmann; Steven Lee Stewart, both of Houston, TX (US)

(73) Assignee: Resolution Performance Products LLC

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/212,083

(22) Filed: Dec. 15, 1998

(51) Int. Cl.$^7$ .......................... C08K 3/10; C08L 63/02; C08L 63/04

(52) U.S. Cl. ................... 525/523; 523/450; 523/457; 523/466; 525/113; 525/454; 525/502; 525/504; 528/113

(58) Field of Search ................... 523/466, 450, 523/457; 525/523, 113, 454, 502, 504; 528/113

(56) References Cited

U.S. PATENT DOCUMENTS

| | | |
|---|---|---|
| 3,252,851 A | 5/1966 | Benson ........................ 161/236 |
| 3,477,990 A | 11/1969 | Dante et al. .................. 260/47 |
| 3,655,595 A | 4/1972 | Higashi et al. ............... 260/18 |
| 3,753,968 A | 8/1973 | Ward ........................ 260/97.6 |
| 4,082,708 A | 4/1978 | Mehta ....................... 260/18 N |
| 4,086,197 A | 4/1978 | Bouche et al. .......... 260/18 PN |
| 4,302,574 A | 11/1981 | Doorakian et al. ............ 528/89 |
| 4,331,726 A | 5/1982 | Cleary ....................... 428/143 |
| 4,332,711 A | 6/1982 | Kooymans et al. ......... 523/402 |
| 4,362,847 A | 12/1982 | Kooijmans et al. ......... 525/172 |
| 4,435,466 A | 3/1984 | Kuhnel et al. ............... 428/215 |
| 4,610,902 A | 9/1986 | Eastman et al. .............. 428/57 |
| 4,668,315 A | 5/1987 | Brady et al. .................. 156/71 |
| 4,689,268 A | 8/1987 | Meader, Jr. ................. 428/413 |
| 4,698,396 A | 10/1987 | Drawert et al. .......... 525/420.5 |

(List continued on next page.)

FOREIGN PATENT DOCUMENTS

| | | |
|---|---|---|
| EP | 423577 | 4/1991 |
| EP | 4-23577 | 4/1991 |
| EP | 442700 | 8/1991 |
| EP | 0477127 A1 | 9/1991 |
| EP | 918071 | 5/1999 |
| JP | 51-48081 | 12/1976 |
| JP | 59-206553 | 11/1984 |
| JP | 60-6411 | 1/1985 |
| JP | 6-103734 | 1/1986 |
| JP | 61162564 A | 7/1986 |
| JP | 3-49948 | 7/1989 |
| JP | 5-163803 | 12/1991 |
| JP | 9-195458 | 7/1997 |

OTHER PUBLICATIONS

"Right Chemistry for Leak Protection," Amoco Chemicals, Winter 97–98, pp. 1–3 (Internet).
"Deterioration of Parking Garages," by G. G. Litvan, Building Science Insight, 1984, pp. 1–11 (Internet).
CIM Industrial Membrane Systems Brochure, C.I.M. Industries Inc. (Published around 1992–1993 according to C.I.M. Industries Inc.).
CIM 1000 Commercial Industrial Membrane Coating Profile, C.I.M. Industries Inc. 5/98.
Reichhold® Polylite® Urethane Foam Resins for Roofing Systems Brochure, pp. 1–11. (Unable to obtain the publication date from Reichhold. We call Reichhold's number at 919–990–7500, Reicchold's business staff has not returned our call.).
Retro–Mastic Roofing Systems Inc. Brochure. (around 1995 according to DFW Metro (972) 263–5758.).
"A New Spraying Technology Comes Onto the Scene," by Klaus Buecking, 10/98.
The Waterproof Deck Site—Company Profile and Products Brochures, C. A. Gustafsson Co. (Internet Download), 1996.
Futura Coatings Inc. Technical Data for Futura–Clad Systems, Aug., 1993.
3M™ Scotch–Clad™ Deck Coating (Internet), 1997.
Penta Coatings, "Spray in Place Urethane Foam Insulation and Roofting systems" (Internet), 1995.
"What are Elastomeric Coatings, and How Will They Save you Money?" Advanced Coating Systems, Inc. (Internet), Prior to Apr. 6, 1997.
"Acrylic Elastomeric Products", Advanced Coatings Systems Inc. (Internet Download), 1996.
"Step by Step—Advanced Coatings Systems Elastomeric Reroofing Systems", (Internet Download), 1997.
"Rubber Reroof," Masters Choice (Internet), Apr. 21, 1996.
"Fresh Coat Keeps Coliseum's Roof Strong, Leak–Free" (Internet), 1996.
Patent Abstracts of Japan—vol. 1997, No. 10, Oct. 31, 1997 and JP 09/165,493 (Yuka Shell Epoxy KK) Jun. 24, 1997 Abstract and US 5,962,629, Apr. 2 ,2000.

*Primary Examiner*—Robert E. L. Sellers

(57) ABSTRACT

The present invention relates to thermoset epoxy resin waterproofing membranes for structures such as roofs comprising:
  (a) one or more epoxy resin(s) having an average of at least 1.5 epoxy groups per molecule;
  (b) a liquid amine terminated polyamide prepared by reacting at least one $C_{18-50}$ dicarboxylic acid and an aminoalkylpiperazine in a ratio of moles of aminoalkylpiperazine to equivalents of carboxyl group in the acid of greater than 0.75:1;
  (c) one or more optional polyamine(s);
  (d) one or more optional filler(s); and
  (e) one or more optional modifying resin(s)
wherein the tensile modulus of the thermoset epoxy waterproofing membranes is less than 200,000 psi and the tensile elongation of the thermoset epoxy waterproofing membranes is greater than 20%.

16 Claims, 4 Drawing Sheets

U.S. PATENT DOCUMENTS

| | | | |
|---|---|---|---|
| 4,724,245 A | 2/1988 | Lalanne et al. | 524/61 |
| 4,734,468 A | 3/1988 | Marx | 525/524 |
| 4,827,686 A | 5/1989 | Stamper et al. | 52/408 |
| 5,296,556 A | 3/1994 | Frihart | 525/420.5 |
| 5,296,557 A | 3/1994 | Frihart | 525/423 |
| 5,319,004 A | 6/1994 | Marten et al. | 523/404 |
| 5,496,615 A | 3/1996 | Bartlett et al. | 428/144 |
| 5,962,629 A * | 10/1999 | Corley et al. | 523/414 |
| 5,998,508 A | 12/1999 | Corley et al. | 523/414 |
| 6,008,313 A * | 12/1999 | Walker et al. | 525/425 |
| 6,013,757 A | 1/2000 | Corley et al. | 528/289 |

* cited by examiner

WATERPROOFING MEMBRANE FROM EPOXY RESIN AND AMINE-TERMINATED POLYAMIDE

FIELD OF THE INVENTION

The present invention relates to thermoset epoxy waterproofing membranes comprising one or more epoxy resin(s), a liquid amine terminated polyamide, optional polyamine(s) and/or optional filler(s). The membrane may also include hydrocarbon solvents, water or other viscosity-reducing media.

BACKGROUND OF THE INVENTION

Over time, numerous materials have been used to prevent water penetration for roofs, bridges, parking decks, water-retention ponds, swimming pool liners, basement water barriers, land fills, secondary containment, geomembranes and ponds. In the past, in the area of roofing, materials such as terracotta, slate, metals, asbestos shingles, tar paper, tar and gravel and built up asphalt layers have been used. The problem is that in many instances, these materials proved to be bulky and heavy thereby increasing the static load for the structure.

In addition, ponds and pits for disposal of wastes of chemical plants, petroleum refineries, power plants and mining installations use liners to insure against seepage of aqueous wastes. Traditionally, these liners have consisted of two membrane types, elastomeric and thermoplastic. A common elastomeric membrane is vulcanized EPDM and a thermoplastic membrane is plasticized PVC. Both membrane types have advantages and disadvantages. Vulcanized EPDM has outstanding resistance to outdoor weathering, good cold flexibility, high strength and excellent elongation. Its major disadvantage is the necessity of using adhesives for sealing the membrane seams to provide a continuous leak-free covering. Such adhesives are expensive and time-consuming to apply and are prone to delaminate under stressful conditions because of their low strength. This leads to leaks. Plasticized PVC offers surer seams because the material, being thermoplastic, can either be heat-sealed or solvent-welded to give an integral seam of high strength. Such membranes, however tend to lose plasticizer with time resulting in shortened useful life and poor cold crack resistance.

In the roofing art, the term "flat roof" refers to a roof having a slope of less than about 25° relative to a horizontal plane. Many such roofs are substantially flat with a slight incline to allow water to run off. Some flat roofs comprise numerous sloping sections which create peaks and valleys, and a water drain is generally located to the bottom of each valley to facilitate water drainage. Flat roof traditionally comprise three components (from top to bottom): (1) a waterproof membrane (top); (2) thermal insulation (middle); and (3) the structural deck (bottom).

The flat roof waterproof membrane typically comprises two or more plies of a felt membrane in combination with bitumen (generally coal tar pitch or asphalt). The felt stabilizes and strengthens the bitumen, and distributes tensile stresses when the bitumen is cold and glasslike. Alternatively, the membrane can be a polymeric sheet or a series of polymeric sheets adhered together to form seams where they are joined.

The membrane is typically used in combination with metallic and/or nonmetallic flashings which guard against leakage through portions of the membrane which are pierced or terminated, such as at gravel stops, walls, curbs, expansion joints, vents and drains.

Mineral aggregates (normally gravel, crushed rock, or slag) are often spread atop the membrane to hold it down on the roof deck and protect the membrane from wind, rain, solar degradation and fire. Such aggregate may be unnecessary on smooth-surfaced asphalt roofs having glass-fiber felts.

Conventional membranes cannot resist large movements of the deck or insulation, and will be punctured by heads of fasteners which protrude above the insulation due to such movements. Membrane puncture (due to fastener heads, foot traffic or the like), excessive membrane shifting or movement (due to foot traffic, wind forces or the like) and seam failure are primary causes of leaks in properly installed flat roofs.

Many systems have been devised for providing a roof covering for buildings. One method uses pieces of water-impervious material, such as slate or wood, layered upon the roof in overlapping rows so that each joint is covered by the piece layered above it. Such shingled roofs are satisfactory when the roof is pitched at a high angle so that there is no tendency for the water to flow back through the cracks between the pieces. Even in these cases, when located in areas where freezing occurs, ice occasionally forms on the lower edges of roofs to form a dam which forces water back through the cracks into the interior of the building.

A method of covering low slope roofs that did not have cracks in them was evolved making use of asphalt as an impregnate and bonding agent along with felts of various fibers. The asphalt in the form of a hot liquid or an emulsion was spread over the roof, then pieces of asphalt impregnated felt were rolled out over it. Another layer was then applied moving the location of the seams so that they did not occur in the same area. Built up roofs can be used when the roof was of a low pitch or flat as there were no cracks for water to back up through. The built up roofs fail due to cracks developing because of exposure to weathering and embrittlement of the felt, oxidation of the asphalt, and expansion and contraction of the system because of temperature changes. During cold weather, the asphalt becomes brittle and easily cracks due to expansion and contraction forces.

U.S. Pat. No. 4,827,686 discloses a roofing membrane comprising at least two calendared layers of a cured or uncured compounded flexible rubber, said membrane having at least on its weather side an adherent, cured, pigmented non-staining, durable and flexible coating of from about 0.002" to 0.020" thick of an epoxy resin. As noted in column 3, lines 1–5, the possibility of pinholes is avoided by using at least two calendared layers of the flexible rubber as the membrane. The roofing membrane is then painted with an epoxy resin coating rather than the prior art coatings such as chlorosulfonated polyethylene in order to prevent staining and improve durability.

Therefore, it would be highly desirable to have a thermoset epoxy waterproof membrane which overcomes the problems associated with the prior art membranes.

SUMMARY OF THE INVENTION

The present invention relates to thermoset epoxy waterproofing membranes comprising:

(a) one or more epoxy resin(s) having an average of at least 1.5 epoxy groups per molecule;

(b) a liquid amine terminated polyamide prepared by reacting at least one $C_{18-50}$ dicarboxylic acid and an aminoalkylpiperazine in a ratio of moles of aminoalkylpiperazine to equivalents of carboxyl group in the acid of greater than 0.75:1;

(c) one or more optional polyamine(s);

(d) one or more optional filler(s); and (e) one or more optional modifying resin(s)

wherein the tensile modulus of the thermoset epoxy waterproofing membranes is less than 200,000 psi and the tensile elongation of the thermoset epoxy waterproofing membranes is greater than 20%.

The thermoset epoxy waterproofing membranes are useful for preventing water penetration on roofs, bridges, parking decks, water-retention ponds, swimming pool liners, basement water barriers, land fills, secondary containment, geomembranes and ponds. The thermoset epoxy waterproofing membranes may be used as the original waterproofing system or to replace or repair existing waterproofing systems. These membranes remain flexible over their lifetime, maintain waterproofing properties with use and provide environmental protection while being resistant to water and chemicals thereby providing an extended service life.

DETAILED DESCRIPTION OF THE DRAWINGS

DETAILED DESCRIPTION OF THE INVENTION

Figure 1:
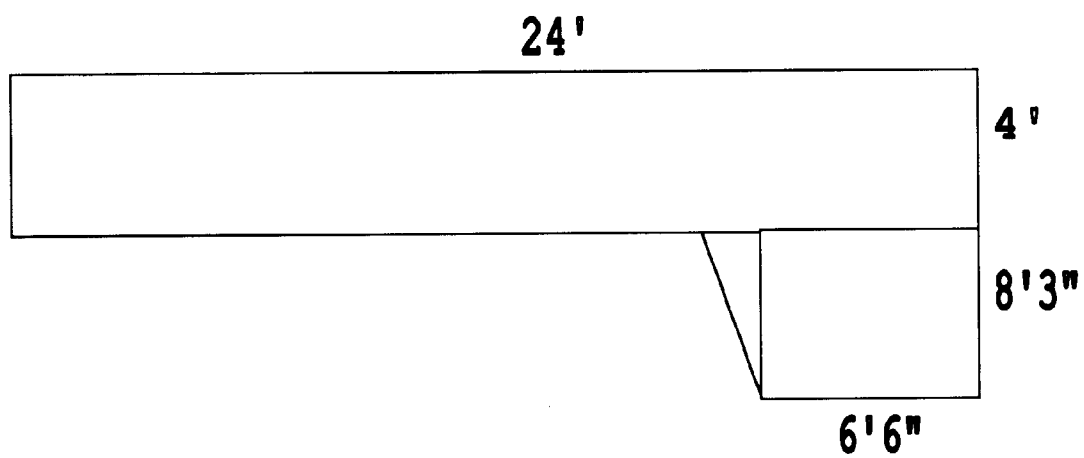
FIG. 1 is a view with the dimensions of the ramp and deck used in Application Example 1.

As used herein, the term "thermoset epoxy waterproofing membranes" refer to the composition(s) of the present invention that provide protection to structures such as, to prevent water penetration for roofs, bridges, parking decks, water-retention ponds, swimming pool liners, basement water barriers, land fills, secondary containment, geomembranes and ponds by preventing the ingress of water and/or chemicals that may come in contact with the structures throughout their lifetime.

As used herein, the term "thermoset" refers to a high molecular weight polymer that results from the reaction of lower molecular weight oligomers and is characterized by irreversible solidification upon reaction. This property is usually associated with a cross-linking reaction of the oligomeric constituents. In many cases it is necessary to add a catalytic agent to initiate the cross-linking reactions.

As used herein, the term "membrane" refers to a soft, pliable layer having a final thickness of from about 0.025" (25 mils) to about 0.250" (250 mils).

As used herein, the term "coating" refers to a liquid, liquefiable or mastic composition which is converted to a solid protective, decorative, or functional adherent film after application as a thin layer. See, *Paint/Coatings Dictionary*, Federation of Societies for Coatings Technology (1978).

As used herein, the term "waterproof membrane" refers to the material(s) that prevent the movement of water into or out of a structure.

As used herein, the term "roof coating" refers to the material(s) that primarily protect the roof membrane/system from environmental effect other than water, such as, ultraviolet light, ozone and chemical attack.

The thermoset epoxy waterproofing membranes of present invention comprise (a) one or more epoxy resin(s) having an average of at least 1.5 epoxy groups per molecule; (b) a liquid amine terminated polyamide prepared by reacting a long-chain dicarboxylic acid and an aminoalkylpiperazine; (c) one or more optional polyamines; (d) one or more optional fillers; and (e) one or more modifying resin(s).

The tensile modulus of the thermoset epoxy waterproofing membranes is less than 200,000 psi. Further, the cured product has good tensile elongation at a value of generally above about 20%, often above about 50%, especially from about 50% to about 500%.

The aminoalkylpiperazine-based amine terminated polyamine used can be produced by reacting long-chain dicarboxylic acids such as dimerized fatty acids ("dimer acids") or adducts of acrylic and methacrylic acid with unsaturated fatty acids ("adduct acids") with aminoalkylpiperazines under conditions effective to produce a liquid amine terminated polyamide. The resultant polyamines have a number-average amine hydrogen functionality of above 1.7 and up to 4. Preferably, the polyamide has an amine plus acid number greater than about 250 and has an excess of amine groups over acid groups.

The aminoalkylpiperazine-based amine terminated polyamine may be prepared by thermal condensation of the aminoalkylpiperazine, preferably in excess, with one or more long-chain dicarboxylic acids or their esters under conditions effective to produce a liquid aminoalkylpiperazine-based amine terminated polyamide. Generally the reaction is carried out at a temperature gradually climbing to a level of above about 200° C., preferably at a final temperature within the range of from about 220° C. to about 260° C. for a time effective to produce a liquid reaction product, followed by distillation, preferably under vacuum, to remove excess unreacted amine, as well as water and/or alcohol reaction product. (The water or alcohol reaction product generally distills at atmospheric pressure before vacuum is applied.) The term "liquid" refers to compositions which have a melting point, or ring and ball softening point (ASTM E28-67) of below room temperature (typically 25° C.). These liquid aminoalkylpiperazine-based amine terminated polyamide are low molecular weight oligomers, typically having number average molecular weight within the range from about 400, preferably from about 700, to about 3000, preferably to about 2000. Alternatively, the amine may be reacted with a chloride of the dicarboxylic acid, but this synthetic procedure is less desirable because of the byproducts produced and the cost of the acid chlorides.

Preferably the long-chain dicarboxylic acid is a dicarboxylic acid having from 18 to 50 carbon atoms. More preferably, the long-chain dicarboxylic acid has from 30 to 40 carbon atoms.

As used herein, "dimer acids" refers to polymeric or oligomeric fatty acids typically made from addition polymerization, using heat and a catalyst, of unsaturated fatty acids, particularly tall oil fatty acids. These polymeric fatty acids typically have the composition of up to about 20% of $C_{18}$ monobasic acids, about 45 to 95% of $C_{36}$ dibasic acids, and about 1 to 35% of $C_{54}$ tribasic and higher polymeric acids. The relative ratios of monomer, dimer, trimer and higher polymer in unfractionated dimer acid are dependent on the nature of the starting material and the conditions of polymerization and distillation. Methods for the polymerization of unsaturated fatty acids are described, for example, in U.S. Pat. No. 3,157,681.

Examples of the "adduct acids" include adducts of acrylic acid, methacrylic acid, crotonic acid, etc. with linoleic acid, soybean oil fatty acid, tall oil fatty acid, etc. These adducts are normally prepared by thermal reaction at temperatures $\geq 200°$ C. Methods for the preparation of these adduct acids are described, for example, in U.S. Pat. No. 3,753,968.

Aminoalkylpiperazines can be represented by the following formula:

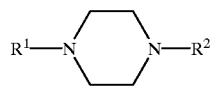 (I)

where $R^1$ and $R^2$ are each independently —H or —$R^3$—$NH_2$, wherein $R^3$ is a divalent aliphatic linkage, preferably a chain of —$CH_2$— units with optional —$CHR^4$— or $CR^4R^5$— units, wherein $R^4$ and $R^5$ are independently alkyl groups, provided that at least one of $R^1$ and $R^2$ are —$R^3$—$NH_2$—. The divalent aliphatic linkage preferably have 2 to 6 carbon atoms. In one embodiment of the present invention, $R^1$ is preferably —H and $R^2$ is —$R^3$—$NH^2$, wherein $R^3$ is a divalent aliphatic linkage, preferably a chain of —$CH_2$— units with optional —$CHR^4$— or $CR^4R^5$— units, wherein $R^4$ and $R^5$ are independently alkyl groups.

Examples of the aminoalkylpiperazine include N-(2-aminoethyl)piperazine, N,N'-bis(2-aminoethyl)piperazine and N,N'-bis(3-aminopropyl)piperazine. N-(2-aminoethyl)piperazine and N,N'-bis(2-aminoethyl)piperazine are typical byproducts of the commercial production of ethylene amines from ammonia and ethylene oxide or ethylene dichloride. N,N'-bis(3-aminopropyl)piperazine is prepared by reacting piperazine with acrylonitrile to form N,N'-bis(2-cyanoethyl) piperazine, followed by hydrogenation of the nitrile groups to amine groups. Methods for the preparation of aminoalkylpiperazines are described, for example, in I. Ono, *Kagaku Keizai,* 26(6), pp. 20–27 (1979) and Q. Sun and C. Zhu, *Shanghai Divi Yixueyuan Xueboa,* 12(3), pp. 178–182 (1985). Preferably the aminoalkylpiperazine is N-(2-aminoethyl)piperazine or N-(2-aminopropyl)piperazine.

To produce a liquid amine terminated polyamide curing agent one uses a starting ratio of moles of aminoalkylpiperazine to equivalents of carboxyl group in the acid or acid mixture used of greater than 0.75:1, more preferably greater than 0.9:1, still more preferably greater than 1:1.

The amine terminated polyamide curing agent can also be prepared by reacting an aminoalkylpiperazine with one or more long-chain dicarboxylic acids and optionally one or more other dicarboxylic acids. Such other dicarboxylic acid can be any dicarboxylic acid having carbon numbers from 4 to 20, which can be a long-chain or not a long-chain dicarboxylic such as, for example, azelaic acid, sebacic acid, and adipic acid. Preferably, the dicarboxylic acids are all long-chain dicarboxylic acids. In one embodiment, a minor amount (preferably up to about 30% of total carboxyl equivalents, although slightly higher levels are considered to be functional) of a monocarboxylic acid such as tall oil fatty acid or soya fatty acid may also be included as a chain terminator. Additional monocarboxylic acids which may be used include, but are not limited to, steric acid, iso-steric acid, lauric acid, palmidic acid, oleic acid, linoleic acid, benzoic acid, phenylacetic acid, and abeitic acid. To obtain the amine terminated polyamide curing agent useful for the invention, up to about 50% of the total carboxyl equivalents, a dicarboxylic acid which is not a long-chain dicarboxylic acid can be used.

The amine terminated polyamide curing agent is present in an amount effective to cure the epoxy resin. The mole ratio of the epoxy resin to liquid amine terminated polyamide curing agent is typically from about 3:1, preferably from about 2:1, to about 1:3, preferably to about 1:2. When (c) one or more optional polyamide(s) are included in the formulation, the molar amount of the amine terminated polyamide is reduced by the molar amount of the optional polyamine(s) to give the appropriate ratio.

As noted above, one or more polyamine(s) other than component (b) can also be included in the composition of the present invention. Examples of these polyamine(s) include diethylenetriamine, triethyltetramine, isophoronediamine, m-xylenediamine and polyoxypropyleneamines. Preferably, the additional amines are polyoxypropyleneamines. When polyoxypropyleneamines are used, they are amines having repeating oxypropylene units of the formula:

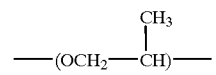

The structures are functionally terminated with primary amine groups positioned on secondary carbon atoms. Preferably, the additional amine is an amine where the total amine concentration is low. Such amines are commercially available from Huntsman Chemicals as, JEFFAMINE® D-230, JEFFAMINE® D-400, JEFFAMINE® D-2000 and JEFFAMINE® T-403 which are represented by the formula:

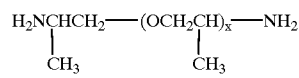

wherein x is 2.3 (JEFFAMINE® D-230) or 5.6 (JEFFAMINE® D-400) or 33.1 (JEFFAMINE® D-2000) or of the formula:

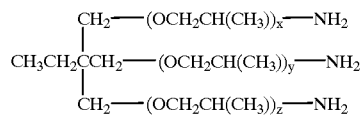

wherein x+y+z is approximately 5.3 (JEFFAMINE® T-403).

If a faster cure rate is desired, heat, one or more chemical accelerators, or heat and one or more chemical accelerators may be added to increase the cure rate. Various amine-compatible accelerators can be used as long as they are soluble in the amine curing agents or epoxy resin. Examples of accelerators include metal salts such as, for example, sulfonates, phosphonates, sulfates, tetrafluoroborates, carboxylates and nitrates of Groups IA, IIA and transition metal series of the Periodic Table (CAS version), preferably Mg, Ca, Zn and Sn salts, and complexes thereof; inorganic acids such as, for example, $HBF_4$, $H_2SO_4$, $H_2NSO_3H$ and $H_3PO_4$; carboxylic acids, preferably hydroxy-substituted carboxylic acids such as, for example, salicylic, lactic, glycolic and resorcylic; phenolic compounds such as, for example, phenol, t-butylphenol, nonylphenol, bisphenol A, resorcinol and pyrocatechol; imidazoles; cyanamide compounds such as dicyandiamide and cyanamide; sulfonamides such as, for example p-toluenesulfonamide, methanesulfonamide, N-methylbenzenesulfonamide and sulfamide; imides such as, for example, phthalimide, succinimide, perylenetetracarboxylic diimide and saccharin and tertiary amines such as benzyl-dimethylamine, dimethylamine ethane and tris (dimethylaminomethyl)phenol. Preferably, when included, the accelerator is selected from hydroxy substituted carboxylic acids, phenolic compounds and tertiary amines.

The accelerators are typically present in an amount of from about 0, preferably from about 0.1, weight percent to about 20 weight percent, preferably to 10 weight percent, based on the curing agent composition.

The one or more epoxy resin(s) can be any epoxy resin which can be cured by the amine terminated polyamide curing agent. Generally, the epoxy resin can be any curable epoxy resin having a 1,2-epoxy equivalency greater than one and preferably, on the average, more than about 1.5 epoxide groups per molecule. The epoxy resin can be saturated or unsaturated, linear or branched, aliphatic, cycloaliphatic, aromatic or heterocyclic, and may bear substituents which do not materially interfere with the curing reaction. Such substituents can include bromine. The epoxy resin may be monomeric or polymeric, liquid or solid, but is preferably liquid at room temperature. Suitable epoxy reins include glycidyl ethers prepared by reacting epichlorohydrin with a compound containing at least one, preferably two or more, hydroxyl groups carried out under alkaline reaction conditions. Examples of epoxy resins suitable for use in the invention include polyglycidyl ethers of polyhydric phenols, epoxy novolacs or similar glycidated polyphenolic resins, polyglycidyl ethers of glycols or polyglycols, and polyglycidyl esters of polycarboxylic acids.

The preferred epoxy resin(s) are resins based on a polyglycidyl ether of a polyhydric phenol. Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl) propane (bisphenol-A); 2,2-bis(4-hydroxy-3-tert-butylphenyl) propane; 1,1-bis(4-hydroxyphenyl) ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Suitable polyhydric phenols can also be obtained from the reaction of phenol with aldehydes such as formaldehyde (bisphenol-F). Fusion products of these polyglycidyl ethers of polyhydric phenols with phenolic compounds such as bisphenol-A are also suitable as epoxy resins, such as those described in U.S. Pat. No. 3,477,990 and U.S. Pat. No. 4,734,468. Commercial examples of preferred epoxy resins include, for example, EPON® Resin 862, EPON® Resin 828, EPON® Resin 826, EPON® Resin 825 EPON® Resin 1001, EPON® Resin 155 and EPON® Resin HPT-1050, each available from Shell Chemical Company.

Additional epoxy resins that can be used include mono- or polyglycidyl ethers of aliphatic or cycloaliphatic alcohols and polyalcohols and phenols. Aliphatic glycidyl ethers can be produced, for example, by reacting an epihalohydrin with an aliphatic diol (optionally containing ether linkages or sulfone linkages) in the presence of a Lewis acid catalyst followed by conversion of the halohydrin intermediate to the glycidyl ether by reaction with sodium hydroxide. Aromatic glycidyl ethers can be produced, for example, by reacting an epihalohydrin with a monohydric phenol in the presence of an alkali. Commercial examples of preferred epoxy resins include, for example, HELOXY® Modifier 68 (the diglycidyl ether of neopentyl glycol), HELOXY® Modifier 107 (the diglycidyl ether of 1,4-cyclohexanedimethanol), HELOXY® Modifier 61 (a butyl glycidyl ether), HELOXY® Modifier 62 (a cresyl glycidyl ether) and HELOXY® Modifier 9 (alkyl $C_{12}$–$C_{13}$ glycidyl ethers), each available from Shell Chemical Company.

Examples of preferred aliphatic glycidyl ethers include those corresponding to the formulas:

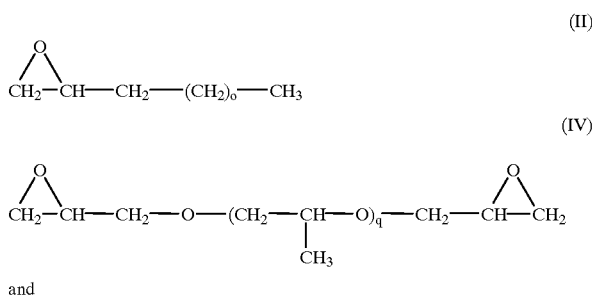

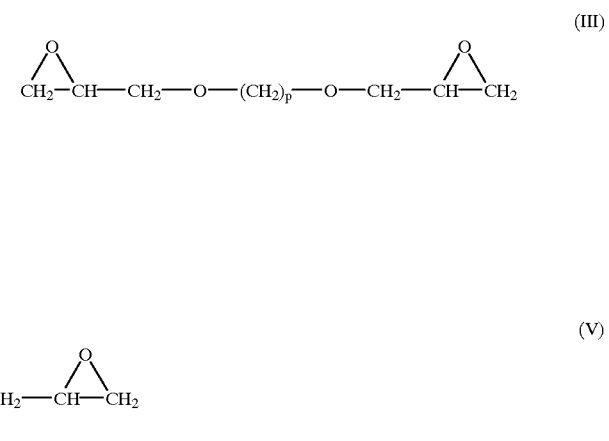

wherein:
o is an integer from 0 to 35, preferably from 3 to 13;
p is an integer from 2 to 12, preferably from 2 to 6; and
q is an integer from 4 to 24, preferably from 4 to 12.

Examples of suitable aliphatic glycidyl ethers include, for example, diglycidyl ethers of 1,4 butanediol, neopentyl glycol, cyclohexanedimethanol, hexanediol, hydrogenated bisphenol A, and polypropylene glycol; triglycidyl ethers of trimethylolethane and trimethylolpropane and caster oil glycidyl ether (HELOXY® Modifier 505).

In addition to the above epoxy resins, glycidyl esters of aliphatic, cycloaliphatic and aromatic acids may be used. The glycidyl esters can be produced by any methods known in the art. The glycidyl esters can be produced, for example, by reacting the aliphatic, cycloaliphatic or aromatic acids with epichlorohydrin and alkali metal hydroxides. Commercial examples include HELOXY® Modifier 10 (glycidyl ester of neodecanoic acid), HELOXY® Modifier 71 (dimer acid diglycidyl ester) and EPON® Resin A-100 (diglycidyl ester of hexahydrophthalate anhydride), each available from Shell Chemical Company.

One or more optional filler(s) can also be included in the present invention. Examples of suitable fillers include minerals or polymers or mixtures thereof. Typical mineral fillers include silica, mica, ground limestone, talc, gypsum, clays, etc. Typical polymeric fillers include thermosetting rubbers (such as neoprenes), rubber particle fillers (Kraton® Rubber particles, chloroprenes, EPDM, urethanes, etc.) and liquid rubbers (CTBN, EKP, silicon rubbers); flexibilizing resins; plasticizers; hydrocarbon resins (such as rosin, low molecular weight polyethylenes and polypropylenes; and coal tar (Modpox®). The preferred mineral fillers are silica, talc and clays. The preferred polymeric fillers are the thermosetting rubbers, liquid rubbers and coal tar.

The one or more optional filler(s) of the present invention are present in a final amount from 0 to 90% by volume based on the final composition. When included, preferably the one or more optional filler(s) will be present in a final amount from 20% to 80% by volume based on the final composition, more preferably in an amount from 30% to 70% by volume based on the final composition.

In addition to one or more optional polyamine(s) and/or optional filler(s), the present invention may also include one or more optional modifying agent(s) including, but not limited to, one or more acrylic monomers, acrylic resins, hydrocarbon resins (such as coal tar) and polyester resins. When included, preferably the one or more optional modifying agent(s) are present in the final amount from 0 to 509% by weight based on the epoxy component, preferably from 5% to 30% by weight based on the epoxy component.

Those of ordinary skill in the art will recognize that additional additives known to the art can be included in the present invention. These additives include but are not limited to dyes and pigments, flow control agents, defoamers, wetting agents, thixotropes and viscosity control agents (such as polyols, silicone oils, urea-formaldehyde resins, melamine-formaldehyde resins, etc.)

In one embodiment of the present invention, one or more epoxy resin(s), a curing agent containing the amine terminated polyamine, and/or optionally an accelerator and/or one or more filler(s) is included. A second embodiment of the present invention contains one or more epoxy resin(s), a, curing agent containing the amine terminated polyamide, one or more additional polyamine(s), and/or one or more filler(s) and/or optionally an accelerator.

The epoxy resin can be blended or mixed with the curing agent containing the amine terminated polyamide and optionally the one or more polyamines, one or more fillers and accelerator simultaneously or in any order at a temperature below the cure temperature which is typically below about 100° C.

When one or more additional polyamine(s) are included in the composition, the composition can be prepared by preblending the one or more additional amine(s) with the liquid amine terminated polyamine component. In the alternative, as noted, the one or more additional polyamine(s) are added with the other components and mixed at one time.

When fillers are included in the composition, the composition can be prepared by preblending the filler(s) with either the epoxy resin component or the liquid amine terminated polyamine component. The filler blended components are then mixed within a short time prior to use.

In an alternative embodiment, the filler(s) are mixed with both the epoxy resin and the liquid amine terminated polyamide. These mixtures may be held for the entire shelf life of the epoxy resin or liquid amine terminated polyamine.

In still another embodiment, all of the components are mixed at one time. The manner in which the formulation is mixed is not critical. The ingredients may be added all at once or one at a time. Preferably, when fillers are included approximately one half of each filler is mixed with the epoxy resin and approximately the other half is mixed with the curing agent in order to keep the same viscosity. This simply allows for convenience with regard to better and easier mixing.

The components may be mixed by hand or by using any known mechanical mixing apparatus which is commonly used in the industry. Preferably, in order to assure complete mixing, a mechanical apparatus such as a Cowles disperser, Hockmeier mixer or Ross Double Plantetary, is used.

Further to facilitate handling or application or use in various environments, the curing agent or the epoxy resin system can be diluted with minor amounts of aliphatic, cycloaliphatic, aromatic ketones or esters; or aromatic solvents.

The thermoset epoxy waterproofing membranes can be applied and cured at a temperature within the range of from about −40° C., preferably from about −10° C., to about 100° C., preferably to about 75° C., for a time effective to cure the epoxy resin. In the more preferred embodiments, the thermoset epoxy waterproofing membranes composition can be cured at a temperature from about 10° C. to about 60° C. for a time effective the cure the epoxy resin. In many instances, the thermoset epoxy waterproof membrane composition can be cured at ambient temperature for a time effective to cure the epoxy resin.

The epoxy resin composition of the invention may include other additives, such as flow control additives such as solvents or anti-sag agents, as well as other additives such as pigments, reinforcing agents, elastomers, stabilizers, extenders, plasticizers, and flame retardants.

The final composition achieved is a thermoset. The final composition has a tensile modulus less than 200,000 psi. The tensile elongation is greater than 20%; preferably greater than 50% and even more preferably between 50% and 500%.

The final thermoset epoxy waterproofing membrane, once mixed, may be applied by any conventional means including, but not limited to, trowel, squeegee, roller, spray (single component or multi-component), brush, mop or broom. The manner in which the thermoset epoxy waterproofing membranes is applied is not critical to the present invention. The total applied thickness of the thermoset epoxy waterproofing membrane ranges from 0.025" to 0.250", preferably from 0.060" to 0.120".

In addition to the above-noted embodiments, the present material may be further utilized as a coating for insulated roofs. For example, in SPF (spray polyurethane foam) applications, self-foaming polyurethane is sprayed on a roof deck to provide an insulation layer for thermal management. Since the polyurethane foam is not stable against water and sunlight exposure, a protective coating must be applied. Typical materials used for this protective coating include sprayable acrylics, polyurethanes and sheet roofing materials. The present invention provides an alternative to these typical materials.

Rigid polystyrene foam insulation is another type of insulated roof material. It is applied as pre-formed sheets that are adhered or mechanically fastened to the roof with typical roofing materials being applied on top of the insulation. The present invention provides an alternative to the typical roofing materials in addition to providing an alternative for adhering the pre-formed sheets to the roof structure.

The present invention will be further demonstrated by the following examples which are included for illustrative purposes only and are in no way meant to limit the present invention.

EXAMPLES

The following curing agents 1 and 2 were used to prepare formulations of roofing membranes as claimed in the present invention. Curing Agent 1 and Curing Agent 2 are the aminoalkylpiperazine-based amine terminated polyamide curing agents. The dimer acid (~10% $C_{18}$ monobasic acids, ~80% $C_{36}$ dibasic acids, ~10% $C_{54}$ tribasic acids) was obtained from Shell Chemical Co. N-(2-aminoethyl) piperazine, commercially available from a variety of vendors, Union Carbide, Dow Chemical Company and E.I. DuPont de Nemours and Co. was used. EPON® Resin 828 (a diglycidyl ether of bisphenol A having epoxy equivalent weight of 185–192), EPON® Resin 815 and 815C (each is a blend of EPON® Resin 828 and HELOXY® Modifier 61 having epoxy equivalent weight of 175–195), EPON® Resin 8132 (a blend of EPON® Resin 828 and HELOXY® Modifier 9 having epoxy equivalent weight of 195–215) and EPON® Resin 8280 (a diglycidyl ether of bisphenol A having epoxy equivalent weight of 185–195) were obtained from Shell Chemical Company. HELOXY® Modifier 9 (an alkyl $C_{12}$–$C_{13}$ glycidyl ether having an epoxy equivalent weight of 275–295) was obtained from Shell Chemical Company.

Curing Agent 1

"Dimer acid" with a Gardner viscosity of Z4 (carboxyl equivalent weight within the range of between approximately 280 and 290) from Shell Chemical Company (1225 grams —COOH equivalents) was mixed with 1130 grams of N-(2-aminoethyl)piperazine (AEP) at a reactant ratio of 2.05 moles amine/eq COOH in a round-bottom flask equipped with a heating mantle, a paddle stirrer, a thermocouple, a nitrogen purge, and a Vigreux column with a vacuum distillation takeoff. The system was purged with nitrogen and heating was started. Typically, when the pot temperature had reached 150–170° C., water began to distill at atmospheric pressure. Water distillation at atmospheric pressure continued until the pot temperature had been raised to 220–240° C.; the pot was held at this temperature until water distillation had stopped or had essentially stopped. Vacuum was then applied and vacuum distillation of the amine was carried out until the pot temperature had risen back to 220–240° C. and the rate of amine offtake had become essentially negligible. Vacuum stripping was then continued at this temperature for approximately another 15 minutes. The product was then allowed to cool to about 150° C. under vacuum or under a stream of nitrogen and were then poured into jars. The products were characterized by amine nitrogen content (by titration) of 6.5% nitrogen by titration and viscosity of Ubbelohde kinematic viscosity 40° C. 28,800 $mm^2$/sec.

Curing Agent 2

"Dimer acid" with a Gardner viscosity of Z4 (carboxyl equivalent weight within the range of between approximately 280 and 290) from Shell Chemical Company (655 grams 2.298 —COOH equivalents) was mixed with 73 grams of tall oil fatty acid (carboxyl equivalent weight within the range of 288 and 300 from Georgia Pacific Company) and 672 grams of N-(2-aminoethyl)piperazine (AEP) at a reactant ratio of 2.04 moles amine/eq COOH in a 2-liter round-bottom flask equipped with a heating mantle, a paddle stirrer, a thermocouple, a nitrogen purge, and a Vigreux column with a vacuum distillation takeoff. The system was purged with nitrogen and heating was started. Typically, when the pot temperature had reached 150–170° C., water began to distill at atmospheric pressure. Water distillation at atmospheric pressure continued until the pot temperature had been raised to 220–240° C.; the pot was held at this temperature until water distillation had stopped. Vacuum was then applied and vacuum distillation of the amine was carried out until the pot temperature had risen back to 220–240° C. and the rate of amine offtake had become essentially negligible. Vacuum stripping was then continued at this temperature for approximately another 1 hour, vacuum is then recovered. The intermediate product (net 1011 grams) had a Garner color of 8–9, % titratable nitrogen 6.81%, amine value of 0.50 and a viscosity of 58,800 cPs. This intermediate product was then blended with 288.9 grams of a polyoxypropylenetriamine having a molecular weight of approximately 403 (commercially available as JEFFAMINE® D-400 from Huntsman Chemicals) and 144.4 grams of para-t-butyl phenol (commercially available from a variety of vendors) was then added to the resulting mixture. The product was mixed until the para tertiary butyl phenol had completely dissolved then allowed to cool to about 60° C. under a stream of nitrogen and were then poured into jars. The products were characterized by amine nitrogen content (by titration) of 5.57% nitrogen by titration and viscosity of approximately 8,200 centipoise.

Thermoset Epoxy Waterproof Membranes

The base properties of the thermosetting resin compositions are included in the table below.

TABLE 1

| Composition (parts by weight) | 1 | 2 | 3 | 4 |
|---|---|---|---|---|
| EPON ® Resin 828 | 100 | | 100 | |
| EPON ® Resin 815 | | 100 | | 100 |
| Example 1 | 195 | 198 | | |
| Example 2 | | | 136 | 138 |
| Handling Properties at 25° C. | | | | |
| Resin Viscosity, cPs | 12,500 | 600 | 12,500 | 600 |
| Curing Agent Viscosity, cPs | 145,000 | 145,000 | 8,200 | 8,200 |
| Blend Viscosity, cPs | 92,000 | 30,500 | 8,400 | 3,900 |
| Mechanical Properties at 25° C. | | | | |
| Tensile Strength, psi | 4,354 | 1,470 | 3,782 | 332 |
| Tensile Elongation at break, % | 169 | 240 | 189 | 260 |
| Tensile Modulus, psi | 218,000 | 8,112 | 213,000 | 168 |
| Tear strength, lb./inch | 934 | 521 | 1017 | 153 |

Physical Properties of Roofing Formulations vs. Alternative Flexible Epoxy Systems In the following table, various flexible epoxy formulations were prepared. Formula 1A and Formula 1B represent the present invention. Formula 1A is based on a liquid epoxy resin that is specially designed for highly filled systems, a monofunctional epoxy modifier and the curing agent set forth in Curing Agent 2 above. Formula 1B contains the same binder system as Formula 1A along with extender mineral fillers. Formula 2(A and B) and Formula 3(A and B) each represent a conventional route to flexible epoxy systems and are included for comparative purposes only. Formula 2A is based on a liquid epoxy resin that is specially designed for highly filled systems, a monofunctional epoxy modifier and a low viscosity polyamide curing agent that has been incorporated at 10% over stoichiometry. Formula 2B contains the same binder system as Formula 2A along with extender mineral fillers. Formula 3A is based on a flexible epoxy resin cured with an ethylene amine. Formula 3B contains the same binder system as Formula 3A along with extender mineral fillers.

For those formulations which did not contain extender mineral fillers, the epoxy resins were first mixed at room temperature and then the curing agent was added while mixing in a suitable vessel. After thorough mixing, the compositions were poured into molds where they were allowed to cure for 24 hours at 25° C., then postcured for 2 hours at 100° C. For those formulations which contained extender mineral fillers, the epoxy resins and extender mineral fillers were first mixed at room temperature and then the curing agent was added while mixing in a suitable vessel. After thorough mixing, the compositions were poured into molds where they were allowed to cure for 24 hours at 25° C., then postcured for 2 hours at 100° C. Note that each of the formulations which contained extender mineral fillers were filled to 45.9%.

Once prepared, the casting plaque for each formulation was tested for A-tear test (ASTM D-624), C-die tensile properties (ASTM D-638), fatigue testing (a modification of ASTM D-5849, test condition 1, with the only modification being that 1 cycle/min. for a duration of 10,000 cycles was used), and low temperature flexibility (ASTM D-1970), each incorporated herein by reference. The data obtained is included in the table below.

Sufficient tensile strength is required in roofing materials only to prevent material failure around localized attachments, damage points, and areas of stress that cause sufficient movement to approach the ultimate elongation. For fully adhered systems, attachment and damage points do not induce areas of stress and thus are not an item of consideration.

Modulus (i.e., stiffness) of roofing systems needs to be low enough to allow the material to easily elongate when under stress without inducing damage to the materials underneath or to the attachment points. Low modulus is preferred in roofing materials because you want the material to give under stresses rather than fail (i.e., lose waterproofing integrity).

Tear strength is the ability of a material to resist the propagation of an existing flaw. Tear strength is particularly important for locally attached roofing materials due to the penetrations and other damage induced during its attachments; however, tear strength is important to all roofing materials because it allows them to sustain damage during normal lifetimes while maintaining the integrity of the waterproofing.

TABLE 2

|  | FORM. 1A | FORM. 1B | FORM. 2A | FORM. 2B | FORM. 3A | FORM. 3B |
| --- | --- | --- | --- | --- | --- | --- |
| EPON ® 8280 | 80 | 80 | 80 | 80 |  |  |
| HELOXY ™ 9 | 20 | 20 | 20 | 20 |  |  |
| HELOXY ™ 71 |  |  |  |  | 100 | 100 |
| Silica |  | 75 |  | 47.83 |  | 67.39 |
| Microtalc MP-15-38 |  | 50 |  | 31.89 |  | 22.46 |
| Resin Component Total | 100 | 225 | 100 | 179.71 | 100 | 189.85 |
| EPI-CURE ® 3164 | 136 | 136 |  |  |  |  |
| EPI-CURE ® 3140 |  |  | 50.5 | 50.5 |  |  |
| EPI-CURE ® 3234 (TETA) |  |  |  |  | 6.02 | 6.02 |
| Silica |  | 75 |  | 47.83 |  |  |
| Curing Agent Component Total | 136 | 211 | 50.5 | 98.33 | 6.02 | 6.02 |
| Liquid Phase | 236 | 236 | 150.5 | 150.5 | 106.02 | 106.02 |
| Filler | 0 | 200 | 0 | 127.54 | 0 | 89.85 |
| Mixture Total | 236 | 436 | 150.5 | 278.0423 | 106.02 | 195.87 |
| Tensile Properties, "C" Die |  |  |  |  |  |  |
| Tensile Modulus, psi | 118.2 | 405.8 | 167300 | 352600 | 507.6 | 1742 |
| Tensile Strength, psi | 214 | 411.3 | 4957 | 4080 | 133.4 | 370.9 |
| % Elongation | 273.2 | 143.2 | 15.79 | 1.3 | 31 | 22.2 |
| Fatigue testing |  |  |  |  |  |  |
| # of Cycles | 10077 | 1150 | 0 | 0 | 0 | 0 |
| Rating | No pinholes or breaks | At 1150 all samples had edge cracking At 8390 4 of the 6 samples cracked through | Failed first cycle 25 mils and 2361 psi | Failed first cycle 15 mils and 2300 psi | Failed first cycle 7 mils and 1087 psi | Failed first cycle at 5 mils and 912 psi |
| A-Tear lb/in MEAN | 83.32 | 16.075 | 59.76 | 40.99 | 18.28 | 43.78 |
| Low Temperature Flexibility, ° C. failure, 180° bend around 1.25" mandrel | −20 to −10 | 0 to 10 | 30 to 40 | 60 to 70 | <−20 | <−20 |

Each of the properties described in the table above plays an important role in determining whether materials will be satisfactory for use in waterproofing applications.

Elongation is important due to building movements from settling, thermal changes, and wind loads. Sufficient elongation is required to accommodate whatever movement occurs in the structure. Typical roofing materials have high levels of elongation to accommodate not only the building movement but to relieve the stresses and strains caused by attachment only at localized points. For a fully adhered system, point attachment is not an issue; thus elongation is required only to accommodate building movement.

Adhesion of roofing membranes to the underlying substrate allows the elimination of attachment penetrations; as well as, the requirement for roofing ballast to prevent wind lifting. A fully adhered roof membrane eliminates the most common causes of roofing material failures.

Fatigue resistance is the ability of a material to withstand mechanical and thermal cycling. Roofing membranes must withstand repeated mechanical and thermal cycling due to environmental changes, building movement and foot traffic. A material may have excellent tensile properties (elongation and strength) but not necessarily, superior fatigue resistance. As noted in the table above, the present invention, with or without extender mineral fillers, demonstrates superior elongation and superior fatigue resistance while maintaining acceptable strength, modulus, tear strength, and low temperature flexibility when compared with conventional routes to flexible epoxies. This highly desirable balance of properties is obtained using the formulation of the present invention.

Application Example 1

The Application of Waterproof Membrane Formulations to Prepainted, Weathered Wooden Deck and Ramp The formulations were made in the same manner as noted in the formulation above with the exception the extender mineral fillers and color pigments were added to the epoxy resin component and the curing agent component prior to mixing the two components. The level of extender mineral fillers and pigments added depended on the final use of the formulation. For instance, the grout formulation was designed to be high in viscosity with high thixotropy while the leveling formulation was designed with lower viscosity to achieve optimal flow and appearance.

areas were characterized by complete delamination of the top layer of the plywood from the underlying layers.

Repair and Application of Waterproof Membrane

The present invention's tolerance to wooden substrates was demonstrated by application of the above formulations to the ramp and deck. In June, 1997, the deck and ramp were swept and then loose paint and/or wood was removed by hand. The deck was washed with a commercial deck wash (i.e., bleach) and rinsed thoroughly. After drying overnight, the delaminated areas were removed by a hammer and chisel to provide a fully intact surface. The joints between the plywood sheets ranged from 1/16" to over 1/4".

Before applying the flexible membrane, the White Grout Formulation was used to level the low spots and to fill the joints. The grout set within 6 hours and was allowed to cure overnight. The next day, the outside application conditions were found to be 90–95 F., 45–50% relative humidity, the surface temperature of the wooden deck and ramp was 120–125 F. (measured by infrared gun). The Leveling and Ramp Formulations were applied by roller to a total final film thickness of 50–60 mils. After applying these formulations, the liquid membrane was topped with a deco-

TABLE 3

Formulations Used On Wooden Deck And Ramp

| | White Grout Formulation | | | Leveling Formulation | | | Ramp Formulation | | |
|---|---|---|---|---|---|---|---|---|---|
| | Lb. | Gal. | % wt. | Lb. | Gal. | % wt | Lb. | Gal. | % wt. |
| RESIN COMPONENT | | | | | | | | | |
| EPON ® 8280 | 750.0 | 77.3 | 20.4 | 218.0 | 22.5 | 18.3 | 218.0 | 22.5 | 18.3 |
| Heloxy ™ 9 | 250.0 | 33.3 | 6.8 | 54.5 | 7.3 | 4.5 | 54.5 | 7.3 | 4.5 |
| Camelwhite CaCO$_3$ | 1174.0 | 51.9 | 31.9 | — | — | — | — | — | — |
| Cab-O-Sil M5 | 117.0 | 6.3 | 3.2 | — | — | — | — | — | — |
| Silcosil 75 (200 mesh) | — | — | — | 135.0 | 6.1 | 11.3 | 135.0 | 6.1 | 11.3 |
| MicroTalc MP15-38 | — | — | — | 94.0 | 4.1 | 7.9 | 94.0 | 4.1 | 7.9 |
| TOTAL | 2291 | 168.8 | | 501.5 | 42.0 | | 501.5 | 40.0 | |
| Pigment (RESIN COMPONENT) | | | | | | | | | |
| Plasticolor Yellow (ED-82596) | | | | 1.3 | | | 1.3 | | |
| Plasticolor Brown (ED-44905) | | | | 0.95 | | | 0.95 | | |
| Plasticolor White (ED-1018) | | | | 10.0 | | | 10.0 | | |
| CURING AGENT COMPONENT | | | | | | | | | |
| Curing Agent #2 | 1,360.0 | 166.9 | 37.0 | 370.6 | 45.5 | 31.0 | 370.6 | 45.5 | 31.0 |
| Ti-Pure R960 | 30.0 | 0.9 | 0.7 | — | | — | — | | — |
| Silcosil 75 (200 mesh) | — | — | — | 318.5 | 14.4 | 26.7 | 315.0 | 14.3 | 26.4 |
| Cab-O-Sil M5 | — | — | — | 2.0 | 0.2 | 0.3 | 5.0 | 0.2 | 0.4 |
| TOTAL | 1390 | 167.8 | 100.0 | 691.1 | 58.0 | 100 | 690.6 | 60.0 | 100.0 |
| PVC | 17.5 | | | 24.8 | | | 24.8 | | |
| PHR of curative | 136 | | | 136 | | | 136 | | |
| Total RESIN COMPONENT + CURING AGENT COMPONENT | 3681 | | | 1192.6 | | | 1192.1 | | |

Original Condition

An existing modular office space building had previously been made wheel chair accessible by means of a ramp and deck. This ramp and deck were chosen as the test site because they receive full unhindered exposure to the sun, elements, and daily foot-traffic. This location was considered a severe-service area. The dimensions of the ramp and deck are shown in FIG. 1.

The surface of this wooden deck and ramp was made of 3/4" plywood which had been painted with standard exterior latex. The entire plywood surface was severely weathered (deep cracks) with severe wear areas. These severe wear rative quartz aggregate (sand-like material for traction). The deck and ramp were placed back into service the next morning.

Eight Month Results

From June, 1997 to March, 1998, the average high temperature was 76.3° F., the average low was 56.4° F. and the average total rainfall/month was 4.2 inches. After almost eight months, the deck remained in excellent condition. There were no signs of membrane failure. There was minimal chalking and very little yellowing. Surprisingly, the deck did not show any leaf stains even though leaves from surrounding oak trees accumulated on the deck. The membrane remained firmly adhered to the plywood and was completely intact as a continuous, formed-in-place material. The aggregate remained firmly embedded in the membrane and there were no signs of any wear path from the daily foot-traffic. The only discernible change observed was a hairline crack that developed at the joint that was originally about 1/8" wide. It appeared that the grout formulation did not have sufficient thixotropy to remain in the joint before setting. The membrane formulation covered the joint but developed a hairline failure due to the excessive gap being covered by the membrane.

Application Example 2

Plywood Deck Test Boxes

TABLE 4

Formulations used on Test Roof Boxes

|  | White Grout | | | White Membrane | | | Black Membrane | | |
| --- | --- | --- | --- | --- | --- | --- | --- | --- | --- |
|  | Lb. | Gal. | % wt. | Lb. | Gal. | % wt | Lb. | Gal. | % wt. |
| RESIN COMPONENT | | | | | | | | | |
| EPON ® 8280 | 220.0 | 22.7 | 19.8 | 217.0 | 22.4 | 18.0 | 217.0 | 22.4 | 18.3 |
| Heloxy ™ 9 | 73.3 | 9.8 | 6.6 | 54.3 | 7.2 | 4.5 | 54.3 | 7.2 | 4.6 |
| Glycerin | 1.4 | 0.13 | 0.1 | — | — | — | — | — | — |
| Camelwhite CaCO$_3$ | 387.0 | 17.1 | 34.9 | — | — | — | — | — | — |
| Ti-Pure R960 | 9.0 | 0.3 | 0.8 | 25.0 | 0.8 | 2.1 | — | — | — |
| Silcosil 75 (200 mesh) | — | — | — | 138.0 | 6.2 | 11.5 | 155.0 | 7.0 | 13.0 |
| MicroTalc MP15-38 | — | — | — | 76.0 | 3.4 | 6.3 | 76.0 | 3.4 | 6.4 |
| TOTAL | 690.7 | 50.0 | | 510.3 | 40.0 | | 502.3 | 40.0 | |
| CURING AGENT COMPONENT | | | | | | | | | |
| Curing Agent 2 | 398.9 | 48.9 | 36.0 | 369.0 | 45.3 | 30.7 | 369.0 | 45.3 | 31.1 |
| Silcosil 75 (200 mesh) | — | — | — | 310.0 | 14.0 | 25.8 | 288.0 | 13.0 | 24.3 |
| Cab-O-Sil M5 | 19.5 | 1.06 | 1.8 | 12.9 | 0.7 | 1.1 | 12.9 | 0.7 | 1.0 |
| Lampblack 30 | | | | | | | 15.0 | 1.0 | 1.3 |
| TOTAL | 418.4 | 50.0 | 100.0 | 691.9 | 60.0 | 100 | 684.9 | 60.0 | 100.0 |
| PVC | 18.5 | | | 25.1 | | | 24.8 | | |
| PHR of curative | 136 | | | 136 | | | 136 | | |
| Total RESIN COMPONENT + CURING AGENT COMPONENT | 1109.1 | | | 1202.2 | | | 1187.2 | | |

Figure 2:
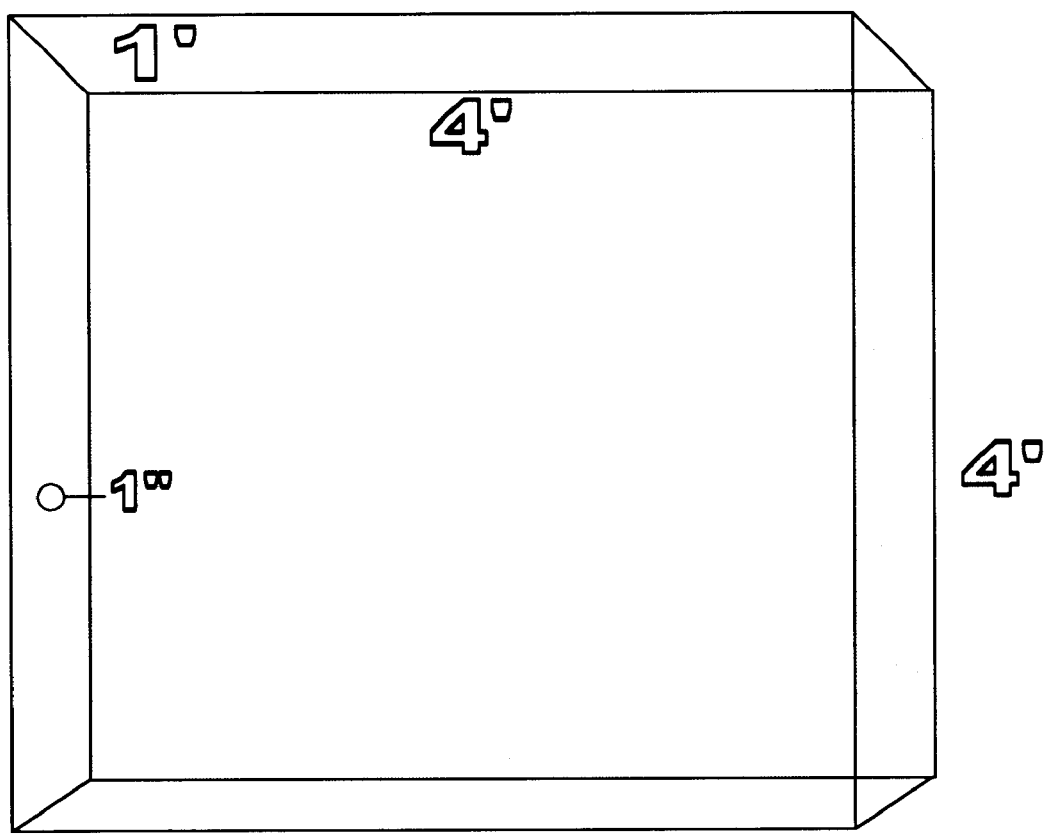
FIG. 2 is a view with dimensions of the test box (Box One) designed to simulate a flat roof area with severe ponding.

To further test the performance of the present invention, two plywood test boxes were constructed. These test boxes are commonly used by roofing system manufacturers to evaluate new formulations. Each box was constructed of 1/4" interior grade plywood using a 4'×4' wooden pallet as the base. The first test box (Box One—FIG. 2) was designed to simulate a flat roof area with severe ponding (pooling of water). As shown in FIG. 2, the interior of the box was completely sealed and had a single drain hole (3/4" diameter) placed 1" up from the bottom of the box.

All joint areas were filled with the White Grout Formulation noted above in Table 4. The interior surfaces were coated with the White and Black Membrane formulations described above using either a brush or a roller. One-half of Box One's interior surface was coated with the White Membrane Formulation. The remaining half of Box One's interior surface was coated with the Black Membrane Formulation. The white formulation was used to evaluate discoloration after prolonged exposure. The black formulation was used to evaluate the effect of excessive heat uptake from solar radiation. To protect the exterior surfaces of Box One from environmental degradation, the exterior surfaces were coated with the Leveling Formulation noted in Example One above.

Figure 3:
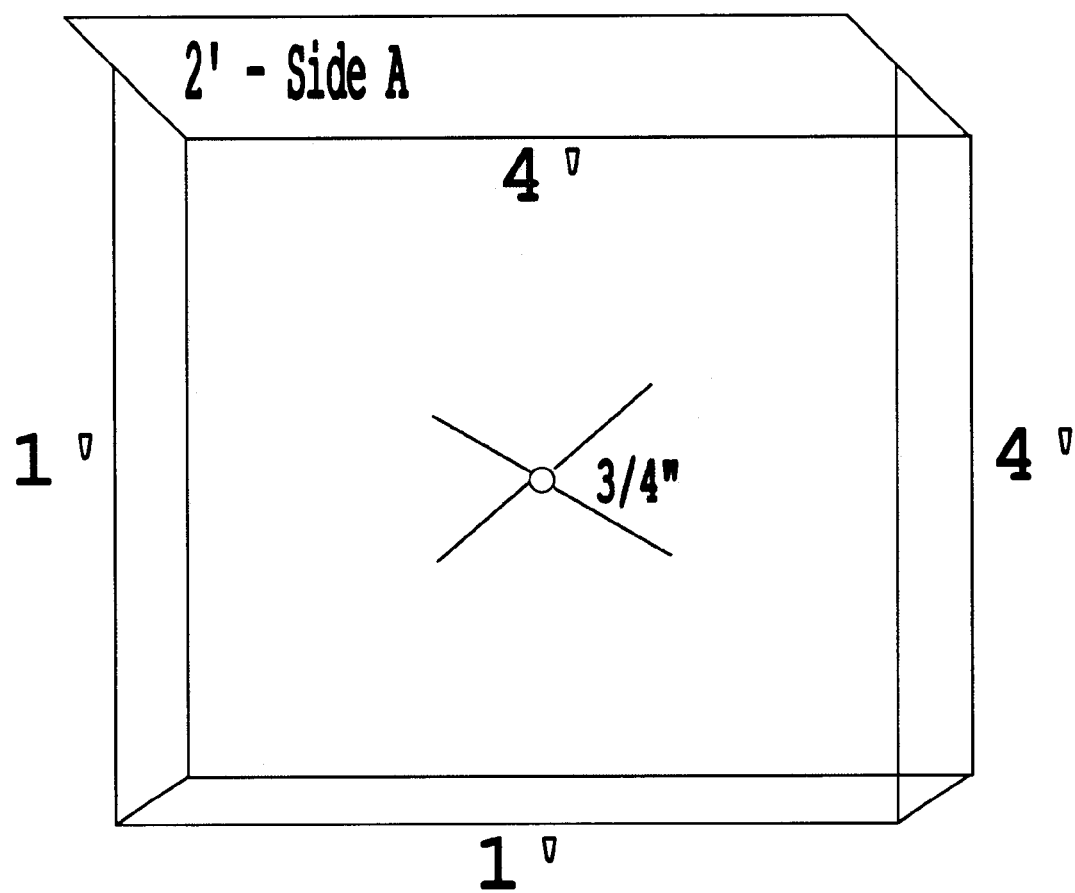
FIG. 3 is the top view with dimensions of the test box (Box Two) designed to simulate a well-drained roof with an area of severe substrate movement.

The second test box (Box Two—FIG. 3) was designed to simulate a well-drained roof with an area of severe substrate movement. Box Two was built so that the base was convex and readily drained through the 3/4"-hole in the box's center. The area of severe substrate movement was created by a non-mechanically fastened, two-foot side (designated as Side A in FIG. 3).

Example 2 formulations were applied indoors to Box 2 in July, 1997. During application, Side A was fastened with wood screws to the pallet and the other three sides of Box Two. All of the joint areas of Box Two were filled with the white grout formulation. After the grout completely cured, the wood screws holding Side A in place were removed. The interior and exterior surfaces were coated as described above for Box One.

After five (5) days of indoor curing, the mechanical fasteners were removed from the 2' side of the box. In effect, this fourth side of the test box was simply "glued" in-place by the grout formulation and then covered with the flexible membrane formulation.

Nine Month Results

From July, 97 to April, 1998, the average high was 76.3° F., the average low was 56.4° F. and the average total rainfall/month was 4.2 inches. Examination of Box One in April, 1998 showed that significant dirt and dust had accumulated in the box but the waterproof membrane had not failed. The surface was still flexible and fully intact. Even with the severe water ponding, there was no evidence of blistering or other failure mechanisms associated with the passage of water through the film. Examination of the box's underside showed no leakage had occurred.

Examination of Box Two in April 1998 showed that the membrane was unaffected by exposure to the elements. Slight chalking could be seen on the black area. This was expected due to the use of a standard bisphenol A epoxy resin in these formulations. Examination of Side A of Box Two (the 2' side of the box) showed that the box withstood several severe thunderstorms. The only noticeable damage was a hairline crack on one edge.

Application Example 3

Application To Existing BUR Roof On Storage Building

TABLE 4

Formulations Used On The Storage Building Roof

|  | Grout Formulation | | | Gray Membrane Formulation | | |
|---|---|---|---|---|---|---|
|  | Lb. | Gal. | % wt. | Lb. | Gal. | % wt. |
| RESIN COMPONENT | | | | | | |
| EPON ® 8280 | 1825 | 188.1 | 15.7 | 1020 | 105.2 | 17.8 |
| Heloxy ™ 9 | 460 | 61.3 | 4.0 | 255 | 34.0 | 4.4 |
| Glycerin | 8.1 | 0.8 | 0.1 | — | — | — |
| Cab-O-Sil M5 | 110 | 6.0 | 0.9 | — | — | — |
| Ti-Pure R960 | — | — | — | 100.0 | 3.1 | 1.7 |
| SuperJet Black | | | | 3 | 0.2 | 0.05 |
| Silcosil 75 (200 mesh) | 2250 | 101.8 | 19.4 | 700 | 31.7 | 12.2 |
| MicroTalc MP15-38 | 900 | 39.8 | 7.7 | 357 | 15.8 | 6.2 |
| TOTAL | 5553.1 | 397.8 | | 2435 | 190 | |
| CURING AGENT COMPONENT | | | | | | |
| Curing Agent 2 | 3107.6 | 381.3 | 26.7 | 1734 | 212.8 | 30.2 |
| Silcosil 75 (200 mesh) | 2820.0 | 127.6 | 24.3 | 1457 | 65.9 | 25.4 |
| Cab-O-Sil M5 | 135.0 | 7.3 | 1.2 | 120 | 6.5 | 2.1 |
| TOTAL | 6062.6 | 516.2 | 100.0 | 3311 | 285.2 | 100.0 |
| PVC | 30.9 | | | 25.9 | | |
| PHR of curative | 136 | | | 136 | | |
| Total RESIN COMPONENT + CURING AGENT COMPONENT | 11,615.7 | | | 5746 | | |
| Weight Mix Ratio | 0.92:1 | | | 0.74:1 | | |
| Volume Mix Ratio | 1.5:2 | | | 2:3 | | |

Original Condition of Building

A storage building with a roof in need of repairs due to age and severe failure of the flashing around the entry ports was used to further test the present invention. The original roof on the building was a traditional multi-layer BUR (built-up roof based on alternating layers of felt and asphaltic sealer) with a heavy layer of roofing stones placed on top to prevent wind-lifting.

The roofing stones, fine grit and weathered asphalt, were mechanically removed prior to application of the present invention. There were several areas on the roof where the fiberglass felt was torn or lifted up from the inner layers. Additionally, the exposed surface showed indentations caused by the weight of the stones. Another difficulty encountered was the severe failure of the flashing around the entry ports. Roof protrusions are notorious areas for roofing failures and in this case, the existing flashing had severely deteriorated.

Application of Waterproofing Membrane

Application of the present invention to the roof was started in August, 1997. At 10 a.m. on the day that application began, the roof's surface temperature in full sun was 160° F. (measured using an infrared temperature gun).

First, areas where the deteriorated flashing had completely pulled away from the entry ports were either adhered to the substrate by a commercial epoxy adhesive grout or in the most severe cases, completely removed by using a box knife. Once these areas were prepared, the grout formulation was applied by trowel to the entire flashing area around the entry portals. Fiberglass mat was pressed by hand-lay-up roller into the grout and additional grout applied to make a smooth surface. The flashing repair job used a total of three layers of fiberglass alternating with flexible epoxy grout with the final layer being the grout formulation itself.

This same grout formulation was also applied to the outer edge of the roof to completely seal the edge of the existing BUR roof to the one inch (1") metal flashing that surrounded the outer edge of the roof. After applying the grout to the entry portals and the roof flashing, the grout was cured overnight.

The next day, the gray membrane formulation was applied to the previously grouted areas. The remaining roof area was coated to a thickness of approximately 50 mils using a roller.

Figure 4:
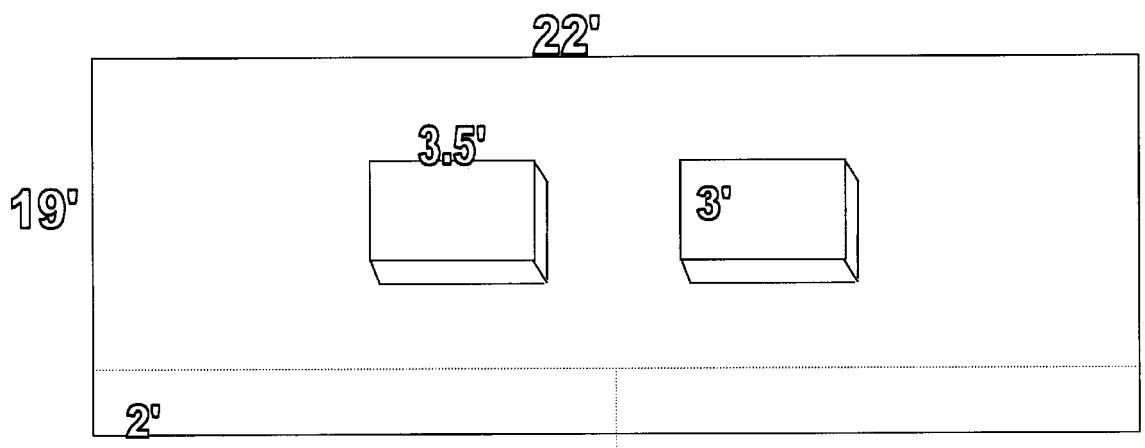
FIG. 4 is a view with dimensions of the roof on the storage building with a two foot area topped with standard roofing granules and roofing gravel on the other section.

Most of the roof area was left as-applied to simulate a synthetic roofing finish but as shown in FIG. 4, a two foot (2') area on the roof's northwest side was topped with standard roofing granules on one section and #2 roofing gravel on the other section. These toppings were simply hand-broadcast on the membrane approximately 60 minutes after the application of the gray membrane formulation. The next morning, the membrane was cured to the point that it could easily be walked on. Inspection of the membrane showed a few pinholes and a few seams that had not completely sealed with the first application.

Five days later, the loose seams and pinholes were completely sealed using additional gray waterproofing membrane formulation.

Six Month Results

From August, 97 to February, 1998, the average high was 80.42° F., the average low was 59.6° F. and the average total rainfall/month was 4.22 inches. At 6 months, the roof remained in excellent condition with no sign of failure. The gray membrane remained firmly adhered and was completely intact as a continuous, formed-in-place roof. The flashing also remained intact. The roofing granules and gravel remained firmly attached to the membrane. The roof had lost some of its gloss but there was only minor chalking. An area of the roof demonstrated severe ponding, but close inspection of this area did not show any evidence of failure.

What is claimed is:

1. A thermoset epoxy resin waterproofing membrane having a thickness ranging from 25 mils to 250 mils, comprising:

(a) one or more epoxy resin(s) having an average of at least 1.5 epoxy groups per molecule;

(b) a liquid amine terminated polyamide prepared by reacting at least one $C_{18-50}$ dicarboxylic acid and an aminoalkylpiperazine in a ratio of moles of aminoalkylpiperazine to equivalents of carboxyl group in the acid of greater than 0.75:1;

(c) one or more optional polyamine(s); and (d) one or more optional fillers;

wherein the tensile modulus of the thermoset epoxy waterproofing membranes is less than 200,000 psi and the tensile elongation of the thermoset epoxy waterproofing membrane is greater than 20%.

2. The membrane of claim 1 wherein the mole ratio of the epoxy resin to liquid amine terminated polyamide is from about 3:1 to about 1:3.

3. The membrane of claim 1 wherein the aminoalkylpiperazine is of the formula:

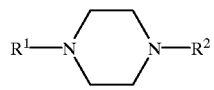 (I)

wherein $R^1$ is —H and $R^2$ is —$R^3$—$NH_2$, wherein $R^3$ is a divalent aliphatic linkage.

4. The membrane of claim 1 wherein the liquid amine terminated polyamide component (b) is prepared by reacting, in a reaction mixture, (i) the $C_{18-50}$ dicarboxylic acid, (ii) at least one other dicarboxylic acid and (iii) the aminoalkylpiperazine.

5. The membrane of claim 1 which further comprises one or more polyamine(s) (C) other than component (b).

6. The membrane of claim 5 wherein the one or more polyamine(s) (C) other than component (b), are selected from the group consisting of diethylenetriamine, triethyltetramine, isophoronediamine, m-xylenediamine and polyoxypropyleneamines.

7. The membrane of claim 1 which further comprises one or more filler(s).

8. The membrane of claim 7 wherein the fillers are selected from the group consisting of minerals, thermosetting rubbers, rubber particles, liquid rubbers, flexibilizing resins other than the rubbers, plasticizers, hydrocarbon resins other than the rubbers, coal tar, and mixtures thereof.

9. The membrane of claim 8 wherein the filler(s) are present in an amount from 20% to 80% by volume based on the final composition.

10. The membrane of claim 4 which further comprises one or more polyamine(s) (C) other than component (b).

11. The membrane of claim 4 which further comprises one or more filler(s).

12. A roof coating comprising the thermoset epoxy resin waterproofing membrane of claim 1.

13. The membrane of claim 1, wherein the membrane has a thickness ranging from 50 mils to 250 mils.

14. The membrane of claim 1, wherein the membrane has a thickness ranging from 60 mils to 120 mils.

15. The membrane of claim 1, wherein the membrane has a thickness ranging from 60 mils to 250 mils.

16. The membrane of claim 1, wherein the membrane has a thickness ranging from 25 mils to 250 mils, and a tensile elongation of more than 50%.

\* \* \* \* \*